Feb. 8, 1949.  R. LAPSLEY ET AL  2,461,217
ONE WAY BRAKE FOR TORQUE CONVERTERS

Filed May 31, 1945  2 Sheets-Sheet 1

INVENTORS:
Robert Lapsley
Burton L. Mills
BY Walter E. Schirmer
Atty.

Feb. 8, 1949.   R. LAPSLEY ET AL   2,461,217
ONE WAY BRAKE FOR TORQUE CONVERTERS
Filed May 31, 1945   2 Sheets-Sheet 2

INVENTORS:
Robert Lapsley
Burton L. Mills
BY Walter E. Schirmer
Atty.

Patented Feb. 8, 1949

2,461,217

UNITED STATES PATENT OFFICE 2,461,217

ONE-WAY BRAKE FOR TORQUE CONVERTERS

Robert Lapsley, Berrien Springs, and Burton L. Mills, Buchanan, Mich., assignors to Clark Equipment Company, Buchanan, Mich., a corporation of Michigan Application May 31, 1945, Serial No. 596,834

6 Claims. (Cl. 188—81)

This invention relates to one-way brake means which may be used for torque converters, and more particularly is directed to an improved type of one-way brake mechanism which may be associated with the stator of such a converter to prevent it from rotating in a reverse direction but allowing it to rotate forwardly so that when a given speed has been reached, the stator can operate with the rotor member to provide, in effect, a fluid coupling.

While the present brake mechanism is illustrated and described in connection with a torque converter, it is to be understood that it may be used for other purposes and in other types of mechanisms where one-way braking action is desired.

We are aware that there are many types of one-way brake mechanisms which have been used in torque converters of this type, the majority of which consist of roller bearing type mechanisms adapted to be wedged into locking position upon reverse rotation of the stator, but arranged to provide for free forward rotation of the stator. The difficulty with such mechanisms is that they have a tendency to wear and brinell the bearing surfaces, and eventually gall the bearing assembly to a point where the operation of the bearing is not satisfactory. In addition, they do not provide a positive lock-up since at slow speeds some reverse rotation can occur.

The present invention is designed to overcome the difficulties inherent in previous constructions and to provide a positive acting brake mechanism which is automatically controlled by the direction of rotation of the stator to provide the desired locking engagement or to release when the stator tends to rotate in a forward direction.

Primarily, the present invention involves the mounting of the stator upon a stationary sleeve member with a ratchet type brake interposed between the hub of the stator and the sleeve, and having one element thereof mounted for sliding movement on a helical spline and frictionally controlled for locking and release movement in accordance with the direction of rotation of the stator. The present mechanism is so designed as to be capable of easy assembly, and is composed of relatively few moving parts.

Other objects and advantages of the present invention, such as its compactness, etc., will be more apparent from the following detailed description, which, taken in conjunction with the accompanying drawings, will describe to those skilled in the art the particular construction and operation of a preferred form of the present invention.

Figure 1:
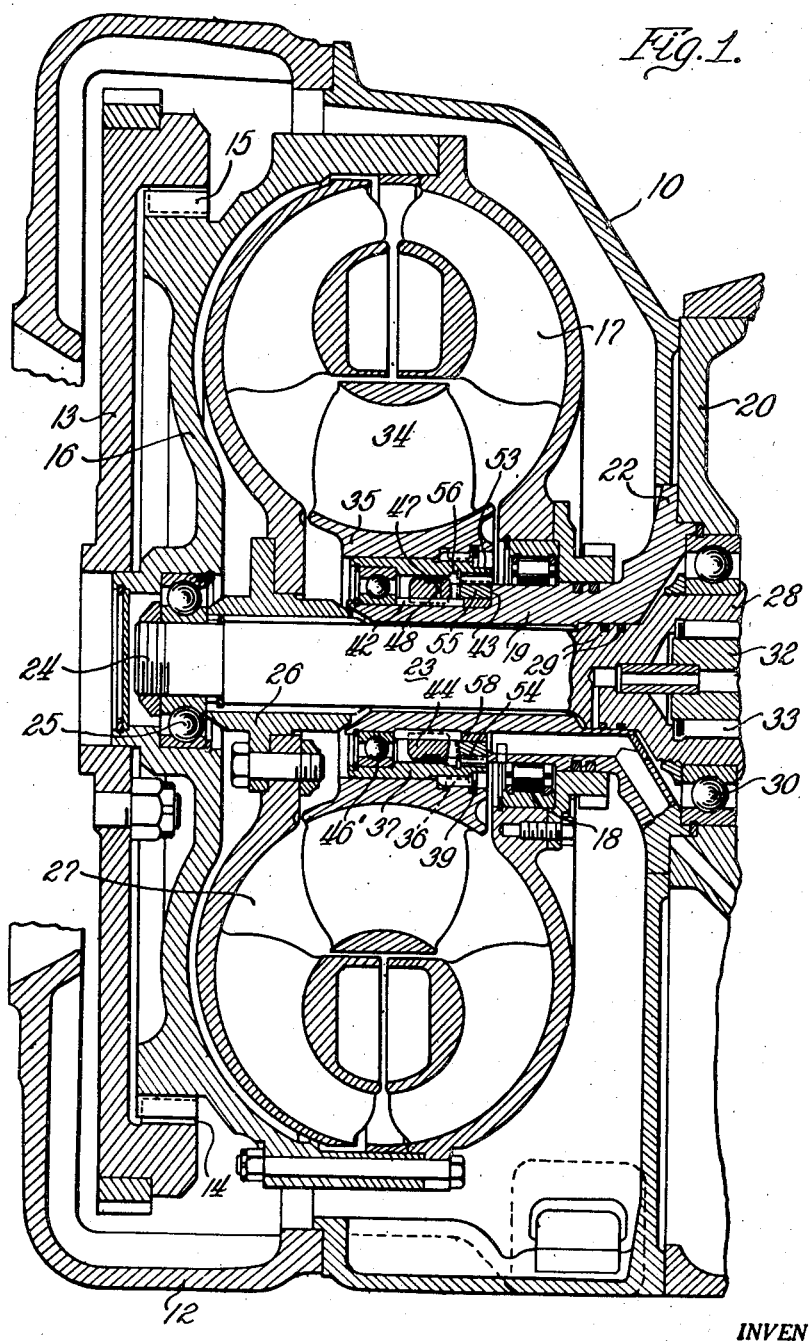
Figure 1 is a sectional view through a torque converter embodying the present invention.

Referring now in detail to the drawings, there is disclosed in Figure 1 a torque converter housing 10, which is adapted to be bolted or otherwise suitably secured and piloted in the flywheel housing 12 of a prime mover, such as an engine or the like. The flywheel 13 of this engine is provided with the internal gear teeth 14 adapted to be locked in mesh with the gear teeth 15 carried by the driving member 16 of the torque converter, this member having secured thereto the impeller 17 which is rotatably mounted by means of the roller bearings 18 upon stationary sleeve member 19, which sleeve member is fixed to the transmission housing 20, as indicated at 22. The stationary sleeve 19 is adapted to encircle and enclose a portion of the driven shaft 23, which shaft at its forward end is reduced, as indicated at 24, and is journalled by means of the bearings 25 within the driving member 16.

Splined upon the shaft 23 adjacent the bearings 25 is the hub portion 26 of a rotor member 27 constituting the driven member of the torque converter, whereby the shaft 23 is driven thereby and in turn has its enlarged end 28 extending into the transmission housing 20. Suitable oil seals 29 are provided on the shaft 23 to prevent oil leakage therealong into the transmission housing. The end 28 of shaft 23 is journalled in the ball bearing assembly 30 carried by the housing 20, and in turn is adapted to receive the reduced end 32 of the output shaft of the transmission which is journalled therein by means of the roller bearing assembly 33.

Interposed between the driving member 17 and the driven member 27 of the torque converter is a stator 34, which stator is provided with a hub portion 35 having splines 36 at one side thereof, whereby a bushing member 37 is splined or keyed to the hub 35 of the stator for conjoint rotation therewith. A suitable snap ring 39 prevents axial movement of the bushing 37 within the hub of the stator.

Figure 6:
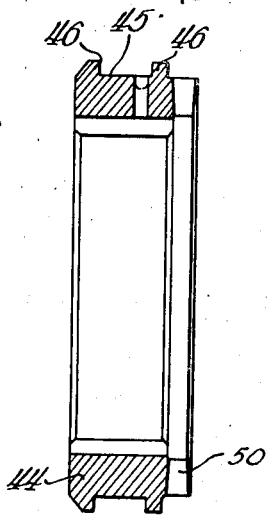
Figure 6 is a sectional view through the brake element shown in Figure 5.

The bushing 37 at one end is journalled for rotation on the bearing assembly 46', which in turn is seated on the extending end of the sleeve 19. The sleeve 19 is provided with a left hand, helically threaded splined portion 42 between the bearing 40 and the radial shoulder 43. Mounted on the splined portion 42 of the sleeve is a brake member 44 having internal splines so that it can be threaded axially on the splines 42. The external surface of the brake member 44, as shown in Figure 6, is provided with a channel-shaped recess 45, defining between the two radial shoulders 46 an axial recess within which is disposed a portion of a coiled spring member 47. One end of the spring member 47 is adapted to be bent inwardly, as indicated at 48, into a radial recess 49 formed in the member 44, thereby locking the spring against displacement relative the recess 45.

The opposite end of the spring is free, but the spring is so coiled that it has frictional engagement on its outer surface with the inner annular surface of the bushing 37. Preferably, the outer annular surface of the spring coils are machined partially flat to increase the surface area of this frictional engagement.

Figure 7:
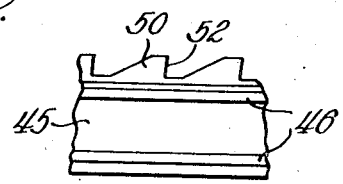
Figure 7 is a detail view of the brake tooth construction of the member shown in Figure 5.

The member 44 on one lateral face thereof is provided with ratchet type brake teeth 50, which, as shown in Figure 7, are adapted to have the tooth portions thereof slightly back cut, as indicated at 52, for a purpose to be described hereinafter. It will be apparent that when the stator 34 is rotating in the same direction as the lead angle of the helical splines 42, the frictional engagement of the spring 47 with the inner surface of the bushing 37 will thread the member 44 axially along the sleeve 19 in one direction, and that when opposite rotation of the stator occurs, the member 44 will be threaded axially along the sleeve 19 in the opposite direction.

Figure 2:
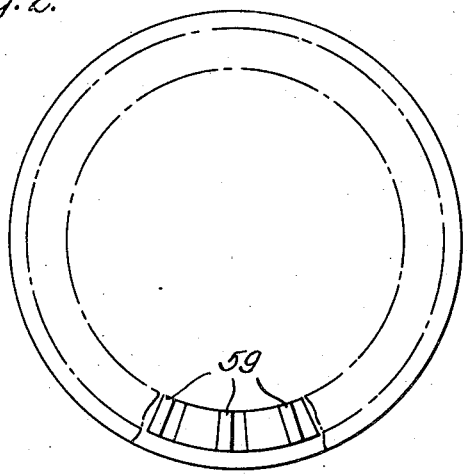
Figure 2 is an elevational view of one of the brake elements.
Figure 3:
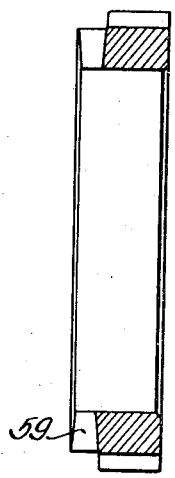
Figure 3 is a section view of the brake element shown in Figure 2.
Figure 4:
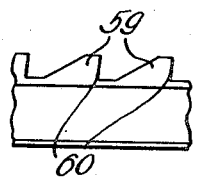
Figure 4 is a detail view of the tooth mechanisms of the brake element shown in Figure 2.
Figure 5:
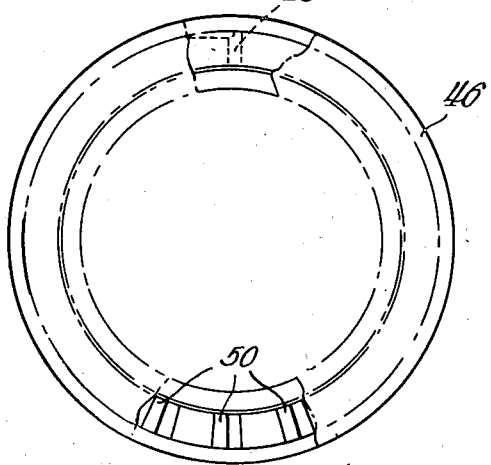
Figure 5 is an elevational view of the other of the brake elements.

The bushing 37 at the end thereof opposite the bearing 40 is provided with an internal splined portion 53 which is adapted to be engaged by the external splines 54 of a second brake member 55, this brake member being held against axial movement in one direction by a snap ring 56, and being held against movement in the opposite direction by abutment against the shoulder 43. The brake member 55 is mounted for rotation upon the spacer 58, and is disposed in position so that the teeth 59 thereof, as shown in Figures 2, 3 and 4, face in the direction to be engaged by the teeth 50 of the brake member 44. The teeth 59 of the member 55 are also slightly back cut, as indicated at 60, so that when the teeth of the two members 44 and 55 are in engagement they will be locked against displacement unless the stator 34 tends to rotate in a direction such as to thread the member 44 axially to the left on the splines 42.

In the operation of this brake mechanism, when the stator 34 is rotating in the same direction as the rotor 27, the frictional engagement of spring 47 on the inner surface of bushing 37 threads the member 44 to the left, as viewed in Figure 1, out of engagement with the member 55, consequently allowing the stator to rotate freely forwardly. However, when the stator 34 tends to rotate opposite to the rotation of rotor 27, or in a direction opposite to the rotation of shaft 23, the frictional engagement of spring 47 within bushing 37 threads member 44 to the right, as viewed in Figure 1, thereby bringing brake teeth 50 of member 44 into braking engagement with the teeth 59 of the brake member 55 carried within the hub of the stator 34. Since the member 44 is locked against rotation when threaded inwardly into this position due to its mounting on the splines of the fixed sleeve 19, it will hold the member 55 against rotation and consequently will lock the stator 34 against reverse rotation.

Thus, the actuation of the brake mechanism within the hub of the stator is automatic in operation, and is controlled solely by the direction of rotation of the stator locking it against rotation when it tends to reverse from the direction of rotation of the shaft 23, and allowing it to freely rotate in a forwardly direction.

We are aware that various changes may be made in certain details of the present construction, and we therefore do not intend to be limited except as defined by the scope and spirit of the appended claims.

We claim:

1. A one-way brake mechanism for the stator of a torque converter including a fixed sleeve having an external helical spline, a hub bushing fixed in said stator having an internal splined end, a first brake member having ratchet teeth on one face thereof mounted on said helical spline and having an external coiled spring thereon frictionally engaging the internal annular surface of said bushing, and a second brake member journalled on said sleeve and splined in the end of said bushing and having cooperating ratchet teeth, whereby rotation of said stator in one direction causes said first brake member to move away from the other brake member, and reverse rotation of said stator moves said first member into clutching engagement to lock said stator against said reverse rotation.

2. The brake mechanism of claim 1 wherein said ratchet teeth are back cut to maintain locking engagement independently of lateral pressure whenever said stator is urged in said reverse direction.

3. A one-way brake mechanism for the stator of a torque converter, comprising a fixed sleeve within the hub of said stator, bearing means journalling one end of said stator hub on said sleeve, a first ratchet member secured within the other end of the hub of said stator and journalled on said sleeve, a second ratchet member having means for threading it axially on said sleeve and including frictional means engaging in the hub of said stator for controlling the engagement of said ratchet members in accordance with the direction of rotation of said stator.

4. The brake mechanism of claim 3 wherein said threading means comprises cooperating helical splines on said sleeve and said second ratchet member.

5. A one-way brake mechanism comprising a fixed sleeve, a rotating member having a hub encircling said sleeve and having a ratchet member secured within one end of the hub thereof and journalled on said sleeve, bearing means journalling the other end of said hub on said sleeve, a second ratchet member mounted for axial threading movement on said sleeve between said bearing means and said first ratchet member, and having frictional means engaging in the hub of said rotating member for controlling the engagement of said ratchet members in accordance with the direction of rotation of said rotating member.

6. A one-way brake mechanism for controlling rotation of a stator of a torque convertor comprising a fixed sleeve member extending into the hub of said stator and having an external helical spline, a radially spaced bushing surrounding said sleeve member and locked in the hub of said stator, a first ratchet member axially movable on said spline and having external coil spring means engaging the inner annular surface of said bushing, a second ratchet member journalled on said sleeve and locked in one end of said bushing, said ratchet members having cooperating back-cut ratchet teeth adapted to maintain engagement independently of lateral pressure whenever said stator tends to rotate in one direction relative to said sleeve member.

ROBERT LAPSLEY.
BURTON L. MILLS.

REFERENCES CITED

The following references are of record in the file of this patent:

UNITED STATES PATENTS

| Number | Name | Date |
| --- | --- | --- |
| 1,899,514 | Lyman | Feb. 28, 1933 |
| 2,037,252 | Martyrer | Apr. 14, 1936 |
| 2,255,591 | Simpson | Sept. 9, 1941 |
| 2,389,520 | Lapsley | Nov. 20, 1945 |